United States Patent
Leon et al.

(10) Patent No.: US 11,629,975 B2
(45) Date of Patent: *Apr. 18, 2023

(54) INDEPENDENTLY OPERABLE LOW-VISIBILITY AID DEVICE

(71) Applicants: Ruben Leon, Oviedo, FL (US); Ananda Leon, Oviedo, FL (US)

(72) Inventors: Ruben Leon, Oviedo, FL (US); Ananda Leon, Oviedo, FL (US)

( * ) Notice: Subject to any disclaimer, the term of this patent is extended or adjusted under 35 U.S.C. 154(b) by 709 days.

This patent is subject to a terminal disclaimer.

(21) Appl. No.: 16/436,673

(22) Filed: Jun. 10, 2019

(65) Prior Publication Data

US 2019/0323857 A1    Oct. 24, 2019

Related U.S. Application Data

(63) Continuation-in-part of application No. 15/914,616, filed on Mar. 7, 2018, now abandoned.

(Continued)

(51) Int. Cl.
*G01C 23/00* (2006.01)
*B64D 47/00* (2006.01)
*B64D 43/00* (2006.01)

(52) U.S. Cl.
CPC ........... *G01C 23/005* (2013.01); *B64D 43/00* (2013.01); *B64D 47/00* (2013.01)

(58) Field of Classification Search
CPC ....... G01C 23/005; B64D 43/00; B64D 47/00

(Continued)

(56) References Cited

U.S. PATENT DOCUMENTS 4,914,734 A * 4/1990 Love .................... G01C 21/005
                                                    342/64
5,344,319 A * 9/1994 Manzke .................... F41H 9/06
                                                    434/14

(Continued)

FOREIGN PATENT DOCUMENTS

EP          1666844 A2      6/2006
JP      2002029499 A *      1/2002 ............. B64D 47/08
JP      2015194374 A *     11/2015

OTHER PUBLICATIONS

"978MHz ADS-B receiver + GPS + AD-AHRS Intallation Guide: iLevil-A"W; Levil Technology Corp; United States; Jul. 30, 2013 (2 pages).

(Continued)

*Primary Examiner* — Isaac G Smith
(74) *Attorney, Agent, or Firm* — Jason T. Daniel, Esq.; Daniel Law Offices, P.A.

(57) ABSTRACT

A low visibility aid device includes a main body having a front end, a back end, a middle section and an interior space. A mounting bracket extends outward from the main body for securing the device onto a manned aircraft for use during flight. A sensor suite is positioned within the main body to capture flight data information including audiovisual information, altitude information, attitude information and heading information of the aircraft during flight. A control unit having a wireless communication unit is positioned within the main body and selectively transmits the flight data information to a user device. A power generation unit generates power for use by the system components during device operation.

15 Claims, 5 Drawing Sheets

Related U.S. Application Data

(60) Provisional application No. 62/683,289, filed on Jun. 11, 2018, provisional application No. 62/486,758, filed on Apr. 18, 2017.

(58) Field of Classification Search
USPC .................................................. 701/3, 36, 40
See application file for complete search history.

(56) References Cited

U.S. PATENT DOCUMENTS

| | | | | |
|---|---|---|---|---|
| 5,927,648 | A * | 7/1999 | Woodland | B64D 7/00 244/129.1 |
| 6,281,970 | B1 * | 8/2001 | Williams | G08B 17/005 356/141.5 |
| 6,349,898 | B1 | 2/2002 | Leonard et al. | |
| 6,422,508 | B1 | 7/2002 | Barnes | |
| 8,102,301 | B2 | 1/2012 | Mosher | |
| 8,205,536 | B2 * | 6/2012 | Fisher | F42B 15/01 89/37.16 |
| 8,256,284 | B2 | 9/2012 | Vozhdaev et al. | |
| 8,882,046 | B2 | 11/2014 | Edsall et al. | |
| 9,118,112 | B1 * | 8/2015 | West | H01Q 1/28 |
| 9,357,111 | B2 * | 5/2016 | White | G03B 17/02 |
| 9,739,570 | B1 * | 8/2017 | Beard | G01S 13/935 |
| 9,776,730 | B1 * | 10/2017 | Leon | G07C 5/085 |
| 9,834,316 | B2 | 12/2017 | Rolinski et al. | |
| 9,893,413 | B2 * | 2/2018 | Johnson | H01Q 21/28 |
| 9,963,242 | B1 | 5/2018 | Lockhart et al. | |
| 2003/0066932 | A1 | 4/2003 | Carroll | |
| 2011/0163908 | A1 | 7/2011 | Andersson et al. | |
| 2012/0298801 | A1 | 11/2012 | Ellison | |
| 2015/0042504 | A1 | 2/2015 | Moffitt | |
| 2015/0217867 | A1 | 8/2015 | Eccles et al. | |
| 2015/0260526 | A1 | 9/2015 | Paduano et al. | |
| 2016/0137311 | A1 * | 5/2016 | Peverill | G05D 1/101 244/110 C |
| 2017/0012813 | A1 | 1/2017 | Skaaksrud et al. | |
| 2017/0069214 | A1 | 3/2017 | Dupray et al. | |
| 2018/0174270 | A1 * | 6/2018 | Burgess | G01S 19/13 |

OTHER PUBLICATIONS

"AHRS-G micro, Attitude and Heading Reference System"; Levil Technology Corp; United States; Jul. 30, 2013 (5 pages).

"AOPA FlyQ EFB ADS-B Primer A pilot's guide to practical ADS-B information without the acronyms"; AOPA Aircraft Owners And Pilots Association; United States; [Updated Jan. 29, 2014] (9 pages).

"iLevil AW introduced"; General Aviation News; United States; Jul. 30, 2013 (5 pages).

"L3G4200D MEMS motion sensor: three-axis digital output gyroscope"; STMicroelectronics; United States; Sep. 2010 (29 pages).

AVweb; "Product Minute: Levil Technology's iLevil AW and Apps"; YouTube; United States; Jul. 29, 2013; www.youtube.com/watch?v=wryzTdE-iX4 (1 page).

Fernandez et al.; "Final Design Report AD-AHRS Pitot Chamber"; Levil Technologies; United States; Apr. 17, 2014 (66 pages).

Garman et al.; "A Portable Data Acquisition System For Flight Testing Light Aircraft"; AIAA Atmospheric Flight Mechanics Conference and Exhibit; American Institute of Aeronautics and Astronautics, Inc.; United States; Aug. 2003 (9 pages).

Hirschman, "Iphone Becomes a Hud"; AOPA; United States: Jul. 20, 2012; https://www.aopa.org/news-and-media/all-news/2012/Jul. 20/iphon-be . . . (3 pages).

Levil Aviation; "iLevil AW—How to Install"; YouTube; United States; Feb. 11, 2014; https://www.youtube.com/watch?v=ryxpK2vJVaU (1 page).

Levil Technology/Levil Aviation; "iLevil AW: Revolutionary ADS-B Receiver for Expenmentals and LSA: The system integrals an AHRS, 978 MHz ADS-B receiver, WAAS GPS and iPad/Android compatibility using its integrated WiFi technology"; AviationPros; Jul. 10, 2013; https://www.aviationpros.com/engines-components/aircraft-airframe-accessories/avionics/press-release/10984831/levil-technologylevil-aviation-ilevil-aw-revolutionary-adsb-receiver-for-experimentals-and-Isa (2 pages).

* cited by examiner

INDEPENDENTLY OPERABLE LOW-VISIBILITY AID DEVICE

CROSS-REFERENCE TO RELATED APPLICATIONS

This application claims the benefit of U.S. Application Ser. No. 62/683,289 filed on Jun. 11, 2018 and is a continuation-in-part application to U.S. application Ser. No. 15/914,616 having a priority date of Apr. 18, 2017, the contents of each of which are incorporated herein by reference.

TECHNICAL FIELD

The present invention relates generally to aircraft flight information systems, and more particularly to an externally located data collection and transmission device for aiding pilots in low visibility situations.

BACKGROUND

The statements in this section merely provide background information related to the present disclosure and may not constitute prior art.

Flying an aircraft requires constant vigilance and attention to detail, especially at night and/or in adverse weather conditions, where visibility of the pilot is reduced. At no time is this more important than during landing, where the proximity of the aircraft to the ground necessitates that the pilot receive accurate and timely information.

Unlike commercial aircraft which are loaded with advanced avionics, navigation, communication, and augmented visibility systems, most light aircraft are not required to carry such equipment. Indeed, many of the most popular light aircraft used today are manufactured with relatively rudimentary panel-mounted instrument packages such as analog altimeters, directional gyro, airspeed indicator, and artificial horizon, for example.

To this end, devices for aiding pilots in reduced visibility situations such as infrared cameras and distance measuring radar, for example, are rarely included with the primary instrument panels such aircraft. Although there are many manufacturers of aftermarket flight data components, most of these components require some type of integration with the onboard instrument panel, and thus affect the primary certified instruments. When this occurs, the owners must have the instruments recertified, which is an arduous and expensive proposition, thus further reducing the commercial viability of such lifesaving products.

Accordingly, it would be beneficial to provide a device that can independently capture flight data information and transmit the same in real time for use by a pilot during low visibility situations, without the need to access the aircraft's primary instrumentation panel.

SUMMARY OF THE INVENTION

The present invention is directed to a low visibility aid device. One embodiment of the present invention can include an aerodynamically efficient main body having a front end, a back end, a middle section and an interior space. A mounting bracket can extend outward from the main body and can include any number of attachment fittings for securing the device onto a manned aircraft for use during flight.

One embodiment of the present invention can include a sensor suite that is positioned within the main body to capture flight data information. The flight data information can include audiovisual information, altitude information, attitude information and heading information of the aircraft during flight.

One embodiment of the present invention can include a control unit that is positioned within the main body. The control unit can include a wireless communication unit for selectively transmitting the flight data information to a user device. The present invention can also include a mobile application or other set of programmatic instructions for displaying the flight data information on the user device in real time.

One embodiment of the present invention can include a power generation unit having a generator, a shaft and a blade assembly. The power generation unit can function to generate power for use by the system components during device operation.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
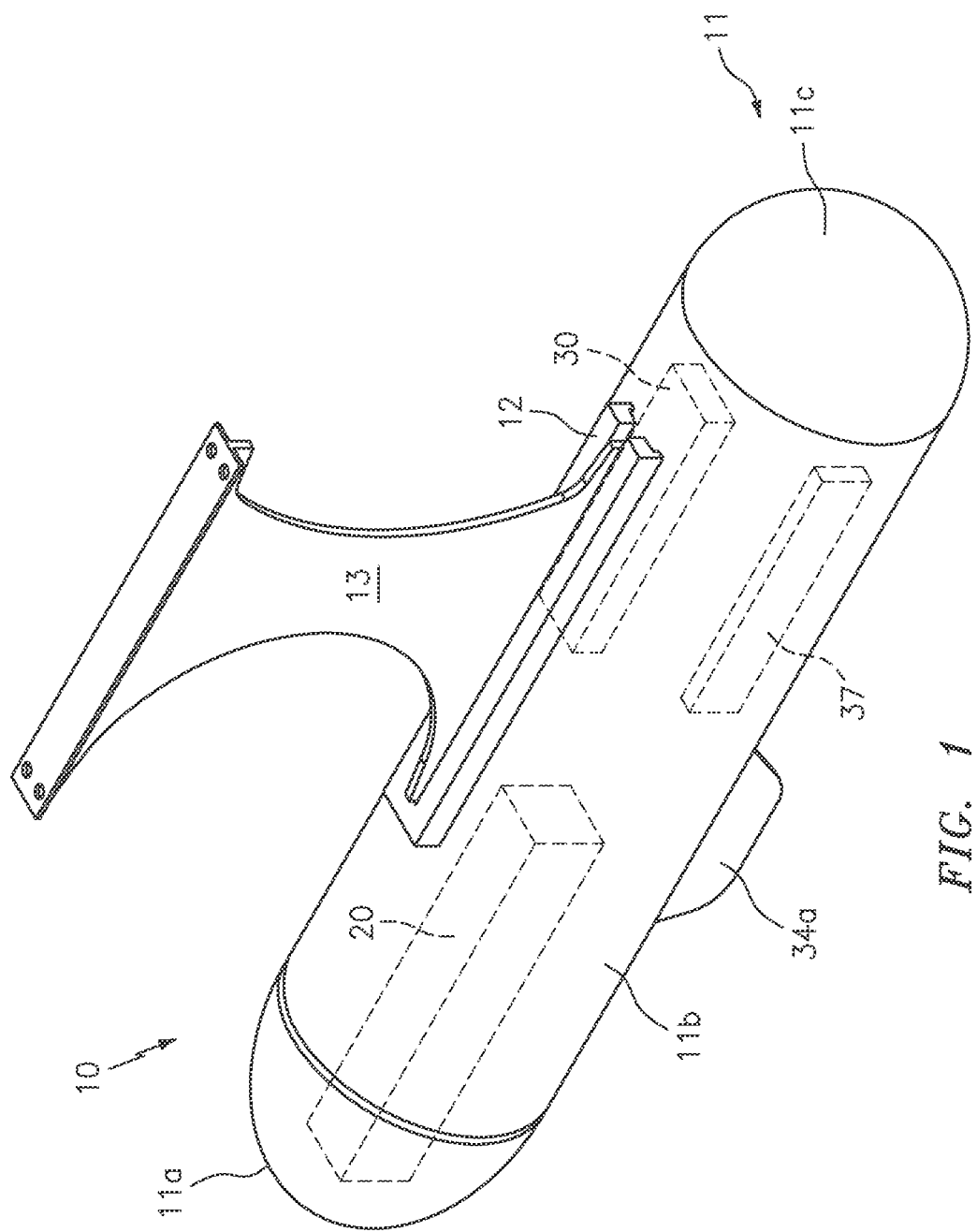
FIG. 1 is a side view of the low visibility aid device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

In various embodiments, the independently operable low-visibility landing aid device 10 can be used in conjunction with other externally mounted instruments such as the above noted application Ser. No. 15/914,616, and to U.S. Pat. No. 9,776,730, to Leon, the contents of which are incorporated herein by reference.

FIGS. 1-5 illustrate various embodiments of an independently operable low-visibility landing aid device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "top end," "bottom end," "right," "left," "front," "vertical," "horizontal," and derivatives thereof shall relate to the invention as oriented in FIG. 1.

FIG. 1 illustrates one embodiment of the flight device 10 that includes a main body 11 having a nosecone 11a, a middle section 11b and a back end 11c, each defining a generally hollow and waterproof interior space. The main body will preferably include the illustrated aerodynamically efficient teardrop shape, however any number of different shapes and sizes are also contemplated.

The nosecone 11a can preferably be constructed from a material that permits infrared transmissions such as clear infrared transmitting glass or infrared grade quartz, for example. The remainder of the main body can be constructed from the same material or any number of different materials such as various plastics, composite materials and/or metals, for example, that do not interfere with the operation of the below described sensor suite and controller, and that are suitable for prolonged exposure to airborne conditions such as high winds, rain, snow and ice, for example.

A slotted receiver 12 can extend outward from the main body 11 and can function to engage an aircraft mounting bracket 13. The mounting bracket can include any number of different shapes and sizes and can function to secure and align the device 10 along the longitudinal axis of the aircraft. In various embodiments, the mounting bracket can include a fixed shape and/or can be adjustable in nature. The mounting bracket can be removably or permanently secured to the aircraft and/or slotted receiver 12 at any number of different positions so as to allow the device 10 to be mounted onto an aircraft at locations such as above the wings, below the wings, and/or along the fuselage, for example. In either instance, the device 10 will preferably mounted with the nose cone 11a facing forward in the direction of flight.

Although not specifically illustrated, any number of attachment fittings can also be provided to secure the mounting bracket to the aircraft. Several nonlimiting examples include screws, bolts, quick connect fittings, clamps, tethers, and/or magnetic elements, for example.

As the name implies, the low visibility aid device 10 is designed to enhance a pilot's situational awareness by independently and continuously providing flight data to a user display device. This data can include, but is not limited to audiovisual information e.g., pictures or video, along with distance measuring information, radar information, attitude information, heading information, and/or location information, for example of the aircraft to which the device is secured.

Figure 2:
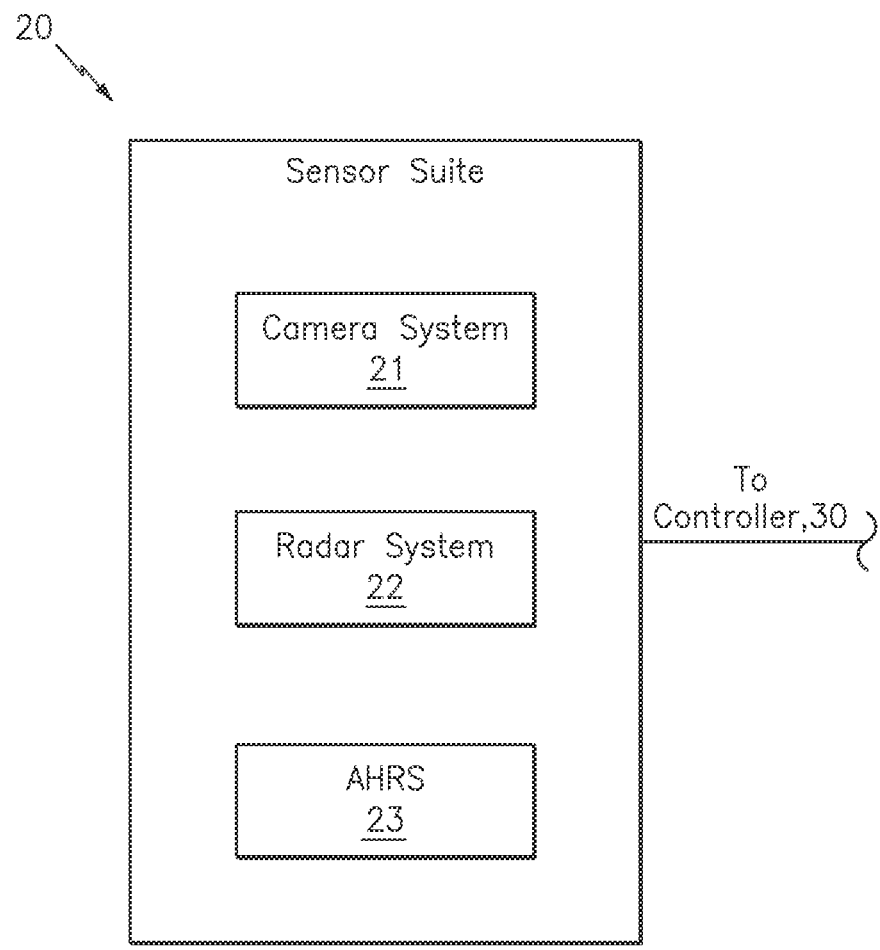
FIG. 2 is a simplified block diagram of the sensor suite of the low visibility aid device, in accordance with one embodiment of the invention.

To this end, the device 10 can include any number of individual sensors, and/or systems referred to collectively as a sensor suite 20 to capture and transmit the flight data information in real time to a user onboard the aircraft. As shown in FIG. 2, one embodiment of a sensor suite 20 for use herein can include a camera system 21, a radar system 22, and an Attitude and Heading Reference System (AHRS) 23.

In the preferred embodiment, the camera system 21 can include an infrared camera that is positioned within the nosecone 11a of the main body so as to face toward the direction of flight at all times. As is known to those of skill in the art, infrared cameras are capable of capturing images in extremely low light situations and enhancing the image for clear viewing by a user on a display screen.

Of course, the camera system is not limited to the use of a single infrared camera, as any number of different and/or additional cameras may also be provided. As such, the camera system 21 may include any type of image capture device capable of capturing still or moving images in any one of the visible, near-infrared, infrared or any appropriate spectrum, and may utilize a CCD (charge-coupled device), CMOS (complementary metal-oxide semiconductor) imaging sensors, for example. Additionally, the image capture device can incorporate any number of known focusing lenses 21a including a short or wide field-of-view lens to capture images that are proximately located near the device. As will be described below, the camera can be communicatively linked to the onboard transceiver 34 in order to allow the camera footage to be viewed in real time by the pilot. Additionally, the camera can be communicatively linked to the onboard memory 32 for storage and/or later analysis.

The radar system 22 can include any number of different devices capable of sending and receiving radio pulses to determine the distance between the device 10 and a secondary object. In the preferred embodiment, the radar system can include, comprise or consist of a radar altimeter capable of determining the altitude of the aircraft and device 10 relative to the ground/terrain. As noted above, the main body 11 can be constructed from materials that do not affect the transmission or reception of radio waves, and thus will not interfere with the operation of the radar system.

As will be known to those of skill in the art, a radar altimeter 22 can include a radar antenna having a transmitter for sending a radar wave, a radar receiver for receiving the radar wave after it has been reflected from the ground, and an integrated processor for measuring the strength and/or time of the reflected beam to determine a distance. Radar altimeters are well known in the art and include the Model: demodistance2gotobo1 altimeter that is commercially available from Infineon®, for example. Of course, any number of other types of radar devices and/or radar altimeters are also contemplated.

In either instance, the radar system 22 can be mounted to a gimbal system 25 that is located within the main body 11. In the preferred embodiment, the gimbal system can include at least two servos for electronically moving the gimbal along at least 2-axes, so as to ensure the gimbal orients the radar antenna perpendicular to the ground at all times, regardless of the orientation of the device 10 and/or the aircraft to which the device is secured. The inclusion of the gimbal system 25 that maintains the radar antenna perpendicular to the ground is important, as this feature ensures the distance measuring radar will work at its maximum efficiency at all times and also reduces inclination errors (e.g., errors caused by incorrect distance measurements to the ground when the aircraft is not completely horizontal).

The gimbal can be communicatively linked to the AHRS system 23 via the control unit 30 to receive operating and orientation instructions. For example, the AHRS can continuously report the orientation of the aircraft/device to the control unit 30, and upon receipt of this information, the control unit can continuously instruct the gimbal to move the radar system to a position wherein the radar antenna is perpendicular to the ground.

One example of a suitable gimbal for use herein includes the FPV 2-Axis brushless gimbal that is commercially available from Banggood.com. Of course, any number of other components capable of adjusting the orientation (e.g., angle, pitch, pan, roll, etc.) of the radar system are also contemplated.

The AHRS 23 can include any number of solid-state or microelectromechanical systems gyroscopes, accelerometers and magnetometers on all three axes, to provide attitude information for aircraft, including roll, pitch and yaw, for example. The AHRS data can be communicatively linked to the onboard transceiver 34 for providing real time attitude and heading information to the pilot and can also be linked to the onboard memory 32 for storage and analysis. Additionally, the AHRS can be communicatively linked directly (or via the processor 31) to the gimbal system 25, in order to provide orientation information to aid the gimbal in maintaining the radar antenna at a perpendicular position to the ground at all times.

One suitable example of an AHRS for use herein includes the AHRS-G micro that is commercially available from Levil Aviation; however, any number of other systems can also be utilized.

The sensor suite 20 can be coupled to the below described control unit 30, so as to receive operating instructions and to allow the flight information to be stored and transmitted to an external display in real time. Although described above as including specific components 21-23, this is for illustrative purposes only, as those of skill in the art will recognize that any number of additional sensors/components can be provided in order to capture any type of flight data information.

Several nonlimiting examples of additional sensors which may be provided as a part of the sensor suite 20 include, but are not limited to: a pitot-static system for determining the aircrafts' airspeed, altitude, altitude trend and/or angle of attack; a satnav system for capturing location information utilizing one or more satellites; and a radio system and/or transponder for capturing and/or transmitting signals such as voice, data, weather, squawk, and/or ADS-B information, for example. Accordingly, the sensor suite is not limited to the type and/or number of individual sensors described above.

Figure 3:
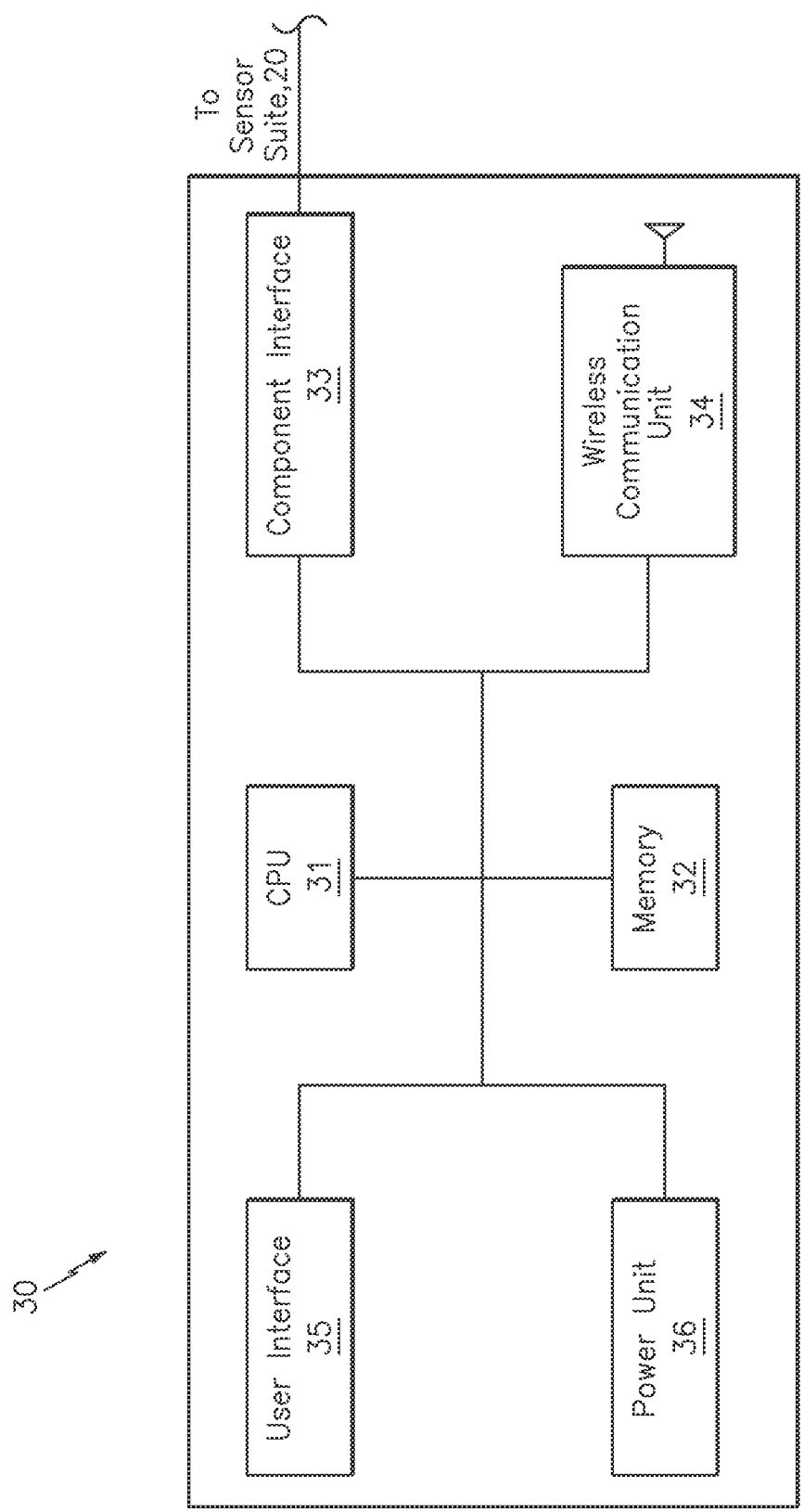
FIG. 3 is a simplified block diagram of the control unit of the low visibility aid device, in accordance with one embodiment of the invention.

FIG. 3 is a simplistic block diagram illustrating one embodiment of the control unit 30, which can control an operation of the sensor suite 20 and can store/transmit the flight information data for real time viewing. As shown, the control unit can include a processing unit 31 that is conventionally connected to an internal memory 32, a component interface unit 33, a wireless communication unit 34, a user interface 35, and/or a power unit 36.

Although illustrated as separate elements, those of skill in the art will recognize that one or more system components 21-23 and/or 31-36 may comprise or include one or more printed circuit boards (PCB) containing any number of integrated circuit or circuits for completing the activities described herein. The CPU may be one or more integrated circuits having firmware for causing the circuitry to complete the activities described herein. Of course, any number of other analog and/or digital components capable of performing the described functionality can be provided in place of, or in conjunction with the described elements.

The processing unit 31 can include one or more central processing units (CPU) or any other type of device, or multiple devices, capable of manipulating or processing information such as program code stored in the memory 32 in order to allow the device to perform the functionality described herein.

Memory 32 can act to store operating instructions in the form of program code for the processing unit 31 to execute. Although illustrated in FIG. 3 as a single component, memory 32 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example. The bulk storage device can contain any number of different programs that permit the processor to perform the functionality described herein, such as controlling the operation of each element of the sensor suite 20, and for storing the flight data information received therefrom, for example. Additionally, memory 32 can also include one or more cache memories that provide temporary storage of at least some program code in order to reduce the number of times program code must be retrieved from the bulk storage device during execution. Each of these devices is well known in the art.

The component interface unit 33 can function to provide a communicative link between the processing unit 31 and various system elements such as the individual sensors of the sensor suite 20, the gimbal system 25, the communication unit 34, and/or the below described power generation unit 40, for example. In this regard, the component interface unit can include any number of different components such as one or more PIC microcontrollers, standard bus, internal bus, connection cables, and/or associated hardware such as USB cables and connectors, and other such hardware capable of linking the various components. Of course, any other means for providing the two way communication between the system components can also be utilized herein.

The communication unit 34 can include any number of components capable of sending and/or receiving electronic signals with another device, either directly or over a network. In one preferred embodiment, the communication unit 34 can include a WIFI transceiver having an antenna 34a for communicating wirelessly with an external device such as a computer tablet or smartphone, for example. Such a feature allowing a user to remotely control an operation of the device 10 and to wirelessly receive/view the flight data information captured by the sensor suite 20 in real time.

In various embodiments, the system can also include a mobile application or other type of programmatic instructions for execution on the external device, in order to allow the device to generate any number of display screens for utilization of the flight data from the sensor suite 20. For example, the system can provide instructions for the external device to display a virtual cockpit having the real time flight data information and/or the camera view. Additionally, the system can also provide instructions for the external device to display the camera footage that is overlaid with the altitude, attitude, heading and other captured flight data information in real time.

Of course, the communication unit is not limited to the use of WIFI communication, as any number of other transmission and reception mechanisms and protocols can also be utilized herein. Several nonlimiting examples include Bluetooth, Near-Field-Communication (NFC) devices, and radio, for example.

The user interface 35 can include or comprise any number of physical components capable of sending and/or receiving information with a user. In one embodiment, the user interface can include one or more buttons or switches that can be located along the main body 11 and connected to the processing unit 31 so as to activate different programmatic functions. For example, one such button can act to initiate programming for instructing the processing unit 31 to transition the device between an ON and OFF operating state, initiate a sleep mode, and/or to pair the communication unit 34 with an external device, and so on. Additionally, the user interface can include or control one or more communication ports 35a such as a Universal Serial Bus or micro USB port, for example, in order to send and receive information with another device via a direct communication link.

The power unit 36 can include any number of different voltage and current regulators capable of providing the necessary power requirements to each element of the system. In various embodiments, the power unit can be connected to one or more batteries 37, which can be located within the main body 11 and/or the below described power generation unit. When provided with the power generation unit, the batteries can function to provide emergency power and/or to allow use of the device before, during or after takeoff. In one embodiment, the batteries can be permanently located within the main body and can be rechargeable in nature via induction charging and/or a charging port 36a, for example. Of course, the batteries can be removable in nature via a battery compartment cover (not illustrated) for allowing a user to access the same.

Figure 4:
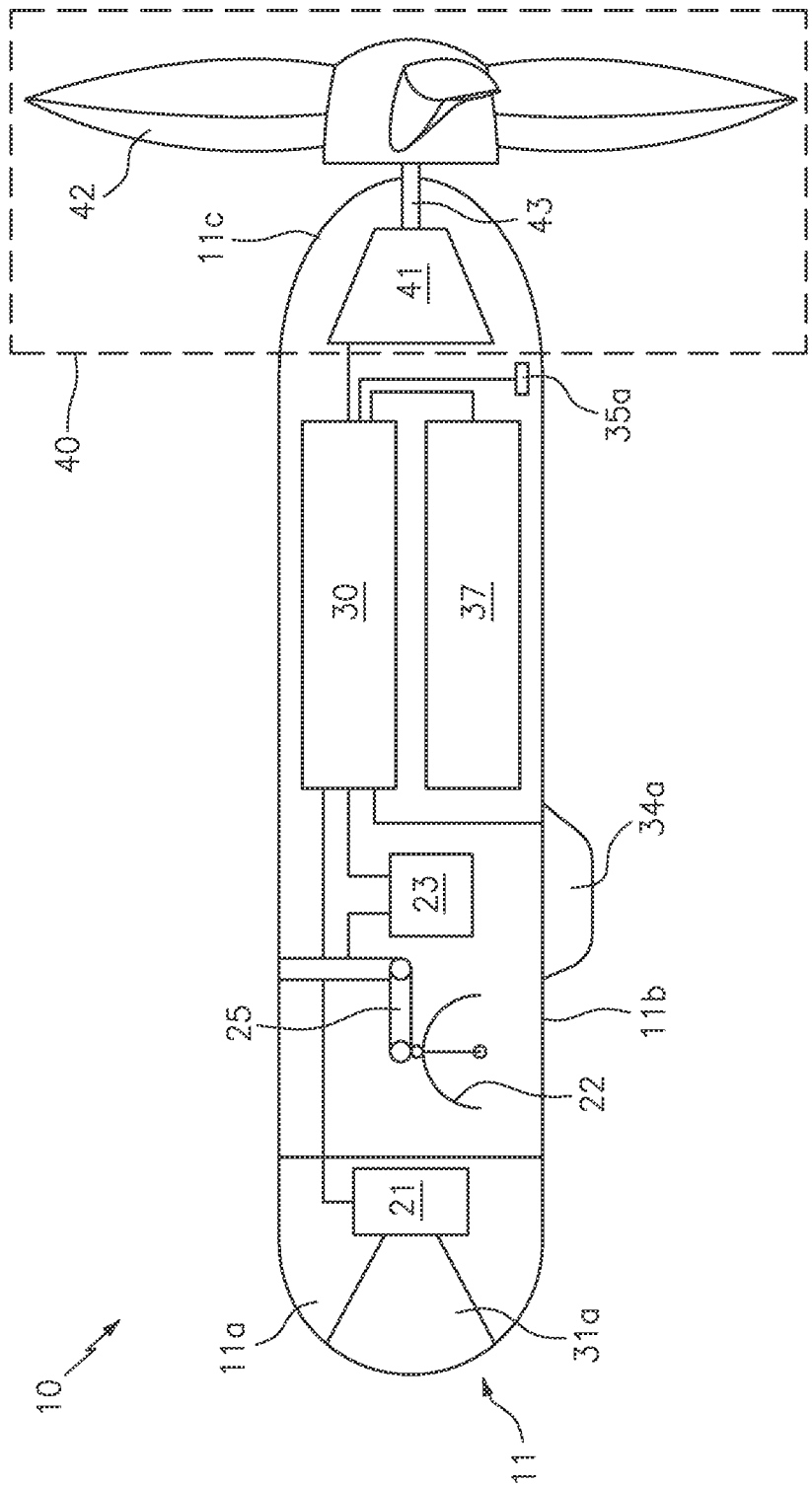
FIG. 4 is a partial cutout side view of the low visibility aid device, in accordance with one embodiment of the invention.

FIG. 4 illustrates one embodiment of the flight data device 10 where a portion of the main body 11 is removed for ease of illustration. As shown, the flight data device 10 can also include a power generation unit 40, which can function to generate usable power for storage by the batteries 37 and/or for direct use by the system components.

In the preferred embodiment, the power generation unit can include a brushless DC generator 41 that is connected to a rotating blade assembly 42 via a shaft 43 that traverses the back end of the main body 11c. The power generation unit can function in the expected manner, wherein during flight, airflow causes the blade assembly 42 and shaft 43 to spin. This mechanical force is transferred to the generator 41 where it is converted into electric energy. Although described as including specific components and locations along the main body, those of skill in the art will recognize that any number of other components and locations are contemplated so as to utilize airflow to generate power for the device components.

Figure 5:
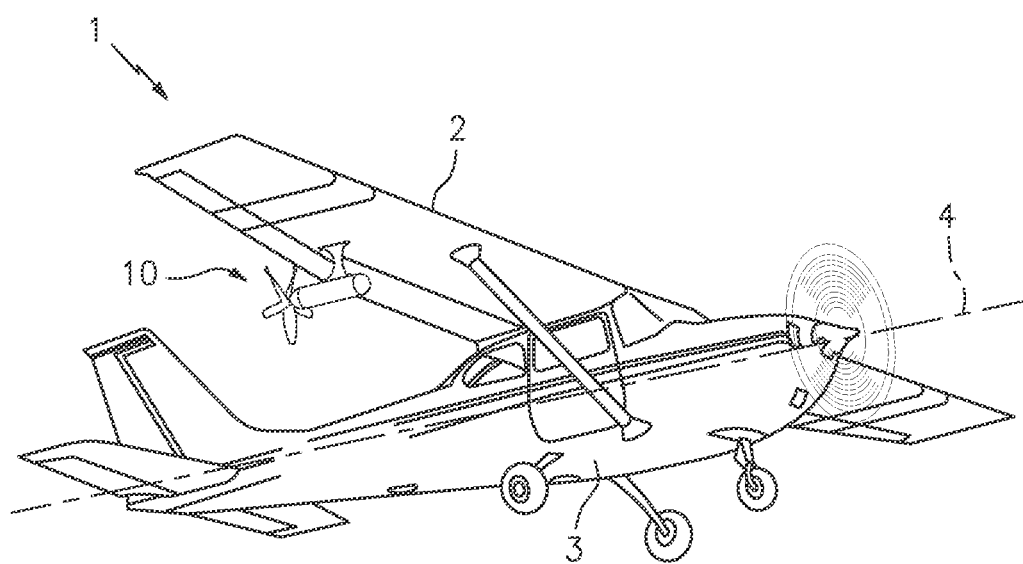
FIG. 5 is a perspective view of the low visibility aid device in operation, in accordance with one embodiment of the invention.

FIG. 5 illustrates one embodiment of the flight data device 10 in operation. As shown, the device 10 can preferably be mounted onto an aircraft 1 having wings 2, a fuselage 3, and a longitudinal axis 4.

Prior to, or during flight, a user can activate the sensor suite 20 directly via the user interface 35 or remotely through an external device such as a tablet computer, for example that is in communication with the wireless transceiver 34. In this regard, the user can instruct the control unit 30 to selectively activate any number of individual sensors of the sensor suite 20. Upon activation, the sensor suite can capture flight data information such as real time camera footage, airspeed, altitude, angle of attack, etc., and transmit the same to the external device for immediate real time viewing by the pilot. The information can also be stored within the memory 32 for later download via the wireless transceiver and/or the communication port.

Accordingly, the above described low visibility aid device 10 functions to augment an aircraft's onboard instruments by providing accurate flight data information including low visibility camera images to a pilot in real time, and without requiring access the aircraft's certified instruments.

As described herein, one or more elements of the flight data device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the terms "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An independently operable low visibility aid device, comprising:
   a main body having a front end, a back end, a middle section and an interior space;
   a mounting bracket configured to engage the main body, said mounting bracket including an attachment fitting that is configured to engage at least one of a wing, a fuselage and a strut of a manned aircraft;
   a sensor suite positioned within the main body, and including radar altimeter having a radar antenna that is configured to send and receive emissions through the main body, said emissions functioning to provide a distance between the antenna and a ground beneath the main body, wherein the sensor suite is configured to capture flight data information and the distance forms part of the flight data;

a gimbal that is connected to the radar altimeter, said gimbal having at least two servos for electronically moving the gimbal along at least 2-axes, said gimbal functioning to maintain the radar antenna in a perpendicular orientation to the ground during flight;

a control unit that is positioned within the main body, said control unit functioning to control an operation of the sensor suite and the gimbal; and a communication unit that is configured to communicate the captured flight data information wirelessly to an external device in real time.

2. The low visibility aid device of claim 1, wherein the flight data information includes images.

3. The low visibility aid device of claim 1, wherein the flight data information includes altitude information.

4. The low visibility aid device of claim 1, wherein the flight data information includes attitude information.

5. The low visibility aid device of claim 1, wherein the flight data information includes heading information.

6. The low visibility aid device of claim 1, wherein the sensor suite includes a camera.

7. The low visibility aid device of claim 1, wherein the sensor suite includes an Attitude and Heading Reference System.

8. The low visibility aid device of claim 1, wherein the control includes:
    a memory for storing the flight data information; and
    a processor.

9. The low visibility aid device of claim 1, wherein the wireless communication unit comprises a WiFi transceiver.

10. The low visibility aid device of claim 1, further comprising:
    at least one battery for providing power to each of the control unit and the sensor suite.

11. The low visibility aid device of claim 10, further comprising:
    a power generation unit that is configured to generate power for storage by the at least one battery.

12. The low visibility aid device of claim 11, wherein the power generation unit comprises:
    a generator that is mechanically connected to a shaft and a blade assembly.

13. The low visibility aid device of claim 12, wherein the shaft traverses the back end of the main body, and the blade assembly is positioned adjacent to the back end of the main body.

14. The low visibility aid device of claim 1, wherein the main body includes an aerodynamically efficient teardrop shape.

15. The low visibility aid device of claim 1, wherein the mounting bracket is removably connected to the main body.

* * * * *